(12) United States Patent
Chan

(10) Patent No.: US 8,548,736 B2
(45) Date of Patent: Oct. 1, 2013

(54) HISTORICAL DATA BASED NAVIGATIONAL ROUTING

(75) Inventor: Janny Chan, Danville, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 675 days.

(21) Appl. No.: 12/382,321

(22) Filed: Mar. 13, 2009

(65) Prior Publication Data

US 2010/0235077 A1    Sep. 16, 2010

Related U.S. Application Data

(60) Provisional application No. 61/202,442, filed on Feb. 27, 2009.

(51) Int. Cl.
*G01C 21/36* (2006.01)
*G08G 1/0968* (2006.01)

(52) U.S. Cl.
USPC ........... 701/414; 701/117; 701/118; 701/119; 701/412; 701/423; 701/425

(58) Field of Classification Search
USPC ................. 701/200–217, 117–119, 412, 414, 701/423, 425
See application file for complete search history.

(56) References Cited

U.S. PATENT DOCUMENTS

| | | | |
|---|---|---|---|
| 6,256,577 B1 * | 7/2001 | Graunke | 701/117 |
| 7,376,509 B2 * | 5/2008 | Endo et al. | 701/423 |
| 8,024,110 B2 * | 9/2011 | Fushiki et al. | 701/119 |
| 2007/0038362 A1 | 2/2007 | Gueziec | |
| 2008/0046165 A1 | 2/2008 | Downs | |
| 2008/0071465 A1 | 3/2008 | Chapman | |
| 2008/0109153 A1 | 5/2008 | Gueziec | |

OTHER PUBLICATIONS

International Search Report in PCT/US2010/00614 dated Feb. 7, 2011.
International Search Report in PCT/US2010/00614 dated May 3, 2010.

* cited by examiner

*Primary Examiner* — Minnah Seoh
(74) *Attorney, Agent, or Firm* — William H. Bollman

(57) ABSTRACT

Navigational routing is generated incorporating an estimation of future traffic conditions. The future traffic conditions are estimated based on historical traffic data, e.g., obtained over a recent period of time. The system provides navigational routing based on historical traffic data incorporated into a calculated route of travel. The historical data is used to calculate a probability that given roads along the route will be problematic at a certain time of the day, i.e., at the time, day of week, and place that you would be expected to be traveling on that certain road. Accordingly, historical traffic data is used to help determine a best route based on the probability of certain roads being problematic at a certain time of day.

7 Claims, 4 Drawing Sheets

HISTORICAL DATA BASED NAVIGATIONAL ROUTING

This application claims priority from U.S. Provisional Application 61/202,442, entitled "Historical Data Based Navigational Routing," filed Feb. 27, 2009, the entirety of which is explicitly incorporated herein by reference.

BACKGROUND OF THE INVENTION

1. Field of the Invention

This invention relates generally to navigation systems. More particularly, it relates to improved navigational routing.

2. Background of the Related Art

If someone wants to travel from Point A to Point B on a future day, there is currently no mechanism to produce an accurate travel time that takes into consideration estimated future traffic. For instance, conventional systems permit a person to generate a route without the effects of traffic, or even to generate a route based on the effects of current traffic conditions. For instance, a tourist might make plans to travel to New York City from Virginia for a Broadway show on the coming Friday, several days hence. FIG. 4 shows a conventional process of generating a best route of travel based on an input (or otherwise obtained) origination of travel, and an input destination of travel.

For instance, as shown in FIG. 4, in step 502 the origination of travel is input or otherwise obtained. In step 504, the desired destination of travel is input. In step 506, the best route of travel from the origination to the desired destination is calculated. Using such an example, conventional "fastest route" routing from Virginia to New York City would indicate that driving the fastest route should take about 7 hours, without traffic considerations.

The driver may print out the fastest route directions from a conventional web program such as MAPQUEST™ on a home computer before the driver leaves the origination point, obtain the fastest route from a suitable web site, e.g., hosted by a travel service such as Automobile Association of America (AAA)™, be directed from a portable navigation device in their car, etc. In any event, eventually, the day of travel comes, and the person departs from Virginia at 10:00 am as planned and follows the planned route to New York City. Let's say that in the given example using a prior art navigation system best, it takes the person 9 hours to drive from their location in Virginia to New York City that day—much more than the originally calculated 7 hours.

The present inventors appreciated that the increase in travel time may be attributed to unexpected delays and traffic jams. Moreover, if the driver is not too familiar with relevant areas of congestion, it is likely that the areas of congestion will not be navigated around. As a result, the travel time is increased, risking missed appointments, show, performance, etc.

SUMMARY OF THE INVENTION

In accordance with the principles of the present invention, a navigation system for providing driving directions comprises a navigation system module to calculate a desired best route to be driven based on user criteria. A historical traffic database contains entries relating an expected speed based on historical traffic conditions of a given road segment, at a given time. The navigation system module has access to the historical traffic database so that it can calculate a deviation between a time of travel based on a posted speed limit and a time of travel based on predicted speeds due to probable traffic.

In accordance with another aspect of the present invention, a method of providing driving directions to a driver comprises obtaining a destination of a trip to be taken. A time of departure of the trip is obtained, the trip to be embarked upon at a time in the future. A best route to the destination is calculated using predicted driving speed based on historical data at an expected time of use of relevant road segments.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

Conventional navigational routing systems provide a best route based on a choice of either a fastest route or a shortest route between the starting point (usually the current location) and a given destination. In accordance with the principles of the present invention, navigational routing is generated incorporating an estimation of future traffic conditions. The use of estimated future traffic conditions is preferably implemented to find a fastest route, or a shortest route.

The present invention provides a system that provides navigational routing based on roads combined with their respective historical traffic data to generate a desired route of travel. Future traffic conditions are estimated based on historical traffic data, e.g., obtained over a recent period of time.

According to an embodiment of the invention, historical traffic data is used to calculate a probability that given roads along a requested travel route will be problematic (i.e., significantly slow traffic below posted speed limits) at a certain time of the day, i.e., at the time, day of week, and place that you would be expected to be traveling on that certain road. Accordingly, the invention uses historical traffic data to help determine a best route including expected traffic, based on the probability of certain roads being problematic at a certain time of a given day.

Figure 1:
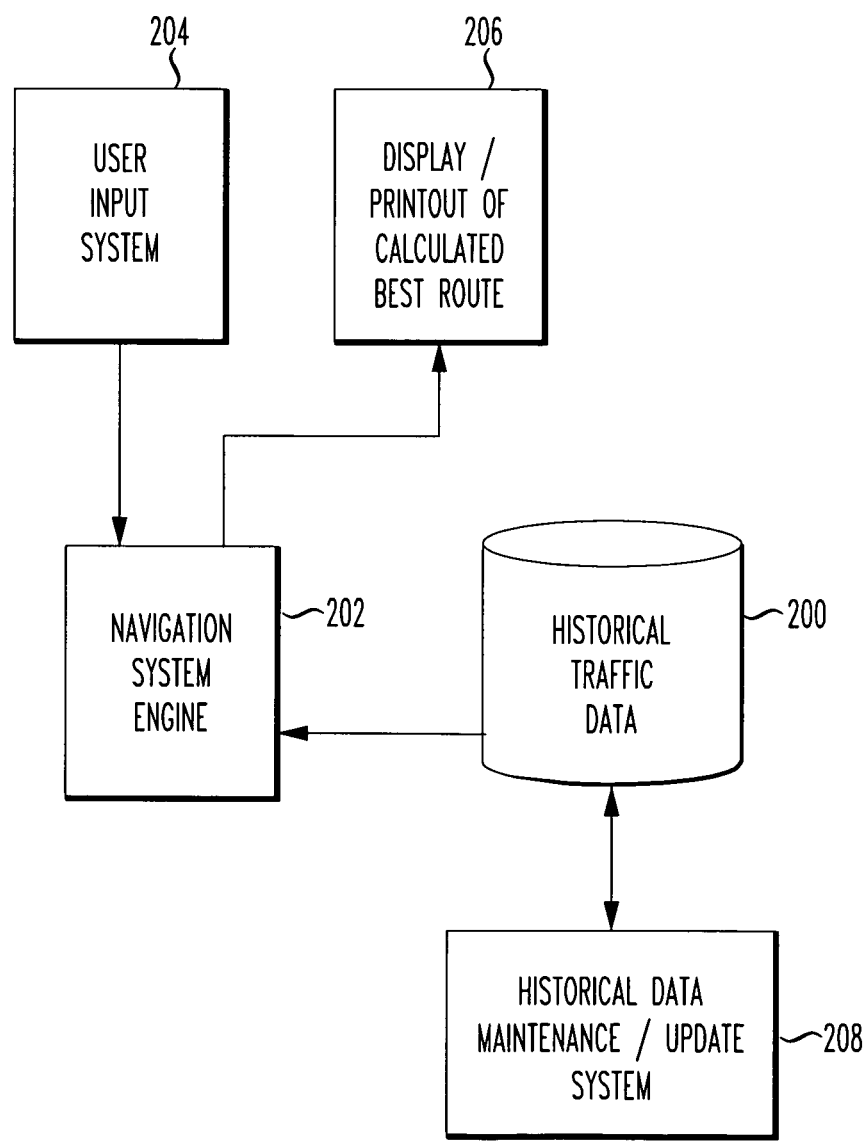
FIG. 1 depicts an exemplary system for providing navigational routing using historical traffic data, in accordance with the principles of the present invention.

FIG. 1 depicts an exemplary system for providing navigational routing using historical traffic data, in accordance with the principles of the present invention.

In particular, as shown in FIG. 1, a navigation system 202 receives route criteria (e.g., a destination) from a suitable user input system 204 (e.g., a keypad). The user is in turn presented with a calculated best route (e.g., fastest or shortest route) including recently experienced historical traffic delays, via a printout or display 206.

Importantly, the navigation system 202 accesses, and makes use of up-to-date historical traffic data 200. The historical traffic data 200 is made up-to-date via an historical data maintenance/update system 208 that periodically or otherwise routinely obtains recent traffic data and compiles it into the historical traffic data database 200. It is preferred that old traffic data be purged, and/or reduced in weighted calculations, to determine a probability of slowed traffic conditions on a given stretch of road at a given time on a given day.

The weighted probability of a given slowed traffic condition can be articulated into a probable speed of a given stretch of road.

The probable speed at a given time, on a given day or date, may be periodically calculated and stored in a road database. For the purposes of calculating any given route, the posted speed limit for any given road segment may be assumed to be the calculated speed due to heavier traffic conditions at a given time, date in the future.

The historical traffic data maintenance/update system 208 may cull older traffic data from the historical traffic data database 200 as desired, e.g., as a configurable value set by the service provider. For instance, data older than 14 days, 21 days, 28 days, etc., may be deleted from the historical traffic data database 200.

Similarly, traffic information relating to one-time events may also be culled or otherwise deleted from the historical traffic data database 200, e.g., traffic data obtained during a nearby celebratory parade for the local pro baseball team.

Figure 2:
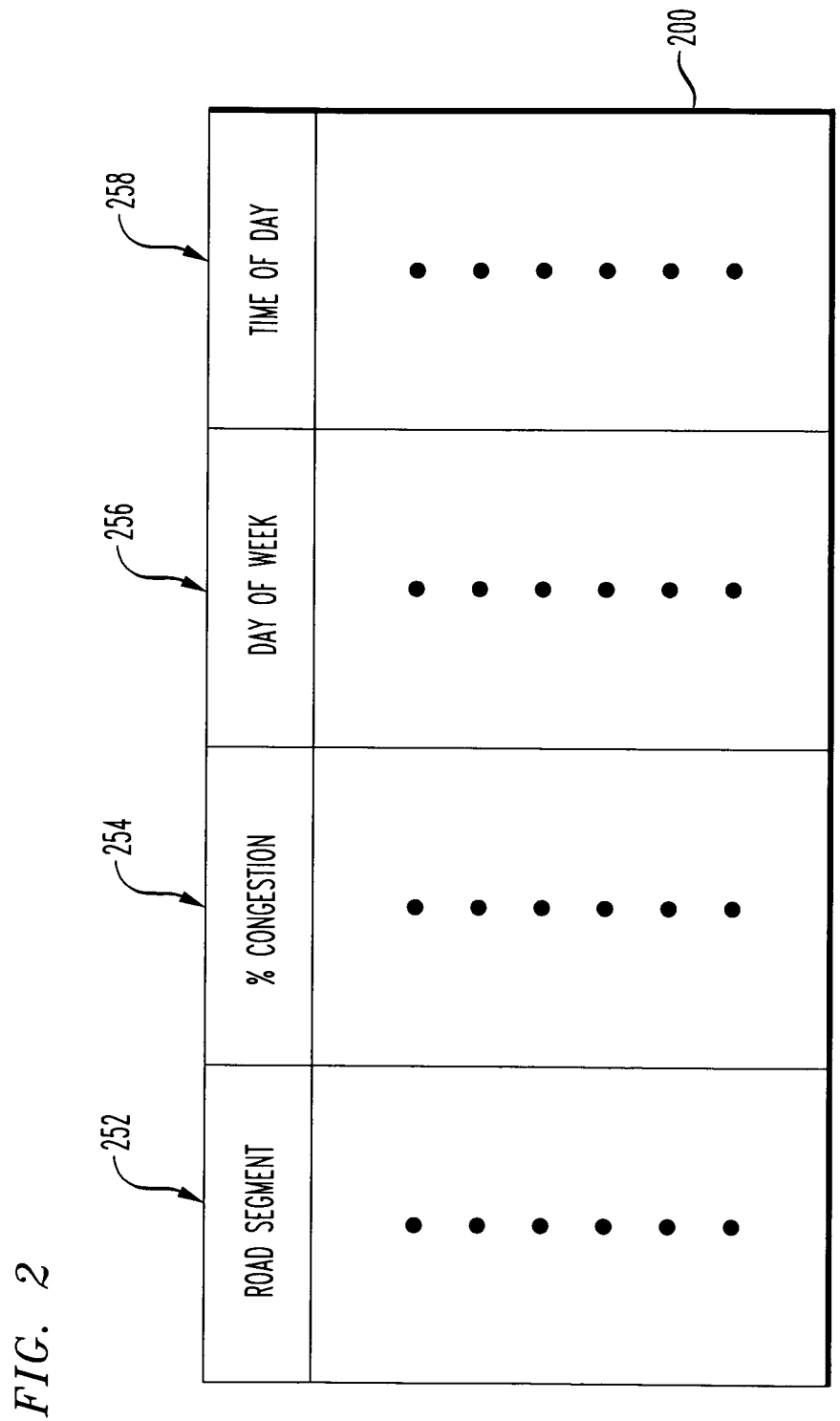
FIG. 2 depicts an exemplary structure of entries in a historical traffic data database, in accordance with the principles of the present invention.

FIG. 2 depicts an exemplary structure of entries in a historical traffic data database, in accordance with the principles of the present invention.

In particular, as shown in FIG. 2, each entry in the historical traffic data database 200 may include pertinent information, e.g., road segment 252, percent congestion (or other quantized measure of an amount of reduction of the posted speed limit for that given road segment) 254, day of week 256, time of day 258, etc. Other information such as the month and day may also be included in each entry in the historical traffic data database 200.

Figure 3:
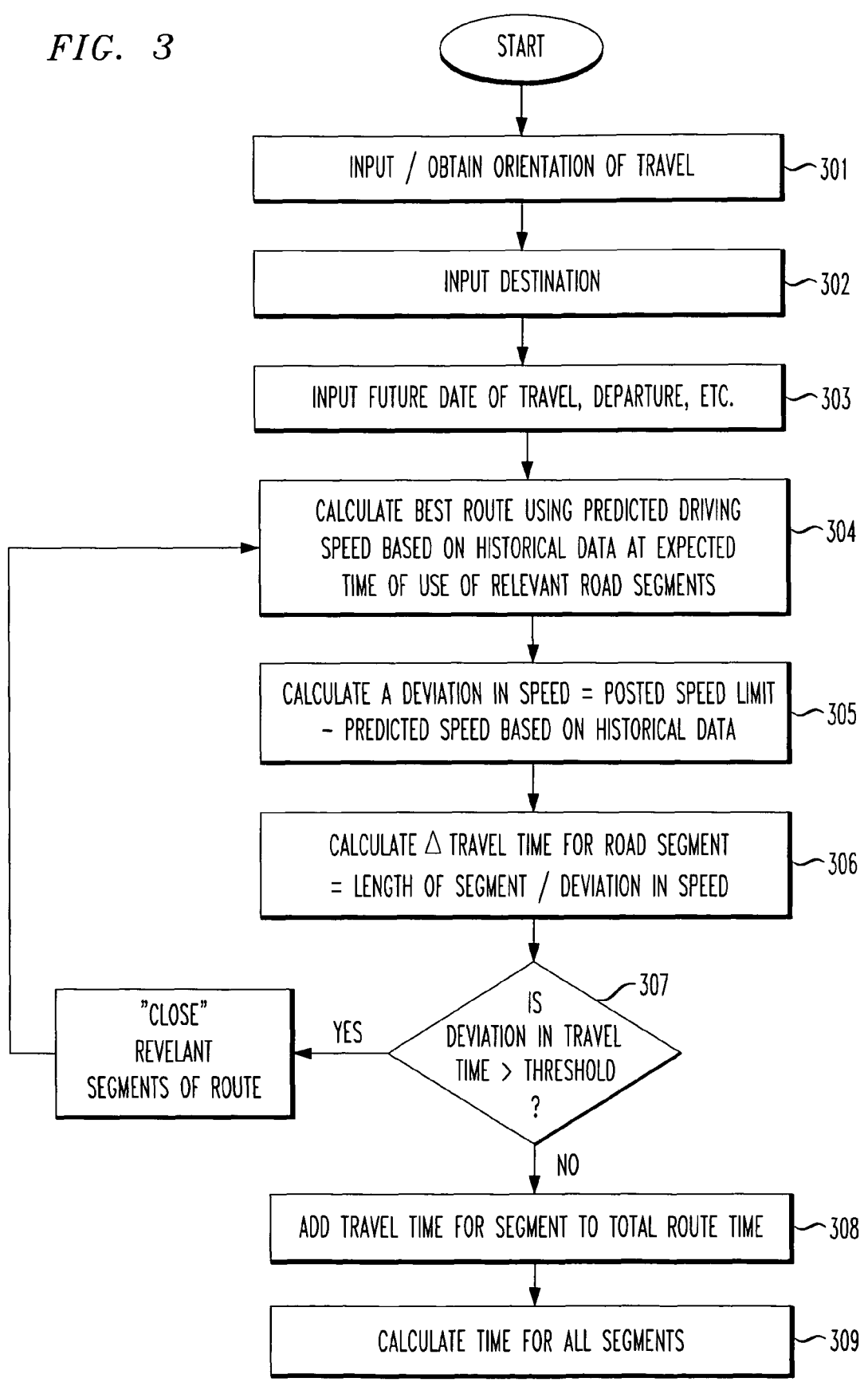
FIG. 3 shows an exemplary process of generating navigational routing based on historical data, in accordance with the principles of the present invention.
Figure 4:
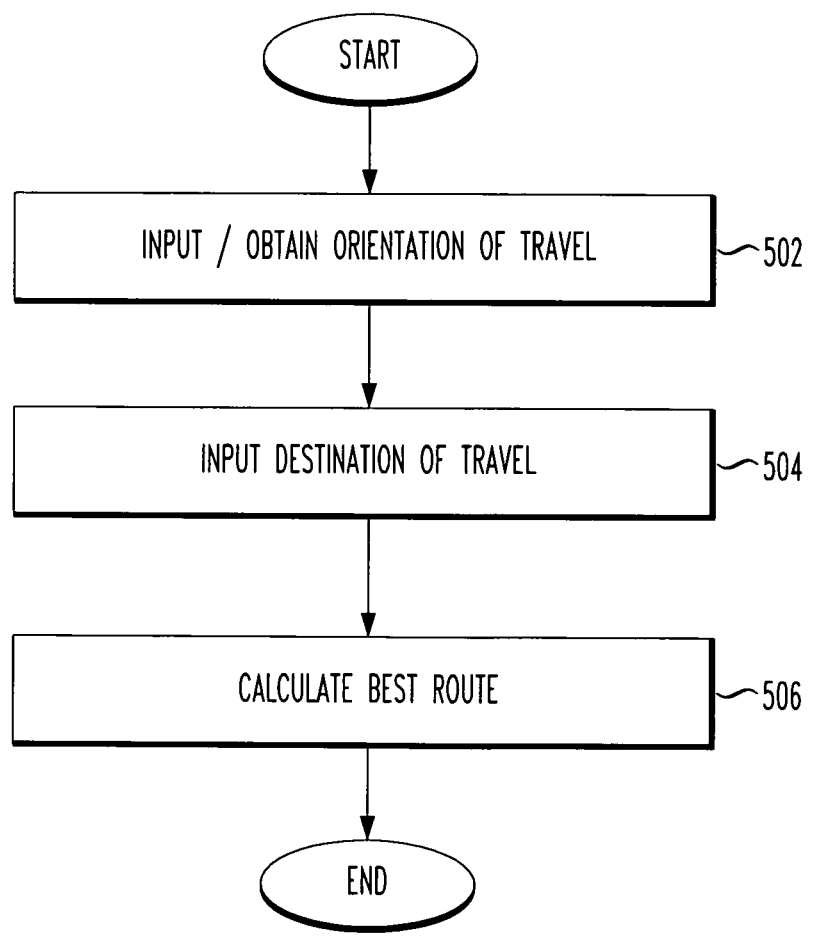
FIG. 4 shows a conventional process of generating a best route of travel based on an input (or otherwise obtained) origination of travel, and an input destination of travel.

FIG. 3 shows an exemplary process of generating navigational routing based on historical data, in accordance with the principles of the present invention.

In particular, in step 301 of FIG. 3, the user inputs an origination of a desired route to be taken (or the current position of the user may be a default origination).

In step 302, the user may additionally input a destination of a desired route, as in conventional systems. In accordance with the principles of the present invention, calculation of best route includes incorporation of historical data information obtained from a historical traffic data database. Now, using the an otherwise conventional route determination process including other user criteria such as a selection between a fastest or shortest route, the best route of travel between the origination and the destination is generated and provided to the user.

In step 303, relevant information is input to the navigation system engine 200 regarding future travel such as the date, day of week, time of departure, etc.

In step 304, starting from the first route segment in the route, the historical traffic data database is searched for the "driving speed with traffic" (or other measure of an expected actual traffic speed) at the given Day/Time. For the first segment, it will be the predicted speed on "Day of Travel (converted from Date)" at the departure "Start Time". The predicted speed at the given time at which the car is expected to travel the relevant segment of road is compared with the posted speed limit for that relevant segment of road to determine a deviation-in-time.

In step 305, the "Difference in Speed"=Regular speed limit−Time-specific driving speed, is calculated.

In step 306, the deviation in travel time for that road segment due to expected traffic conditions is calculated as the Length of road segment/Difference in Speed.

In step 307, if this deviation in travel time exceeds a certain threshold, it is determined that it may be best to generate an alternate route.

If not, in step 308, the travel time for this segment is added to the Total Route Time.

In step 309, steps 304 through 308 are repeated for all other route segments in this route.

At the end of step 309, the Total Route Time should reflect the best estimate of travel time, taking historical traffic data into consideration.

If it is determined that in step 307 the travel time is severely impacted by the estimated traffic condition, then generate an alternate route and go back to step 304. The threshold of severity may be a configuration value set by the provider of the navigation system, or configured in the user preference.

In particular, the threshold can be a deviation percentage from the original travel time. If the total travel time (as a result of the traffic) exceeds the original time by, for example, 10%, then an alternate route is preferable. For instance, if the normal travel time should normally be 10 hours (without any traffic-related reductions in an expected speed of any significant segment of a trip), and the estimated travel time with traffic conditions considered would be 11.5 hours (which is a greater than 10% increase), then that road segment can be temporary "closed" for route consideration and an alternate route should be generated. This threshold can take any desired value, and can be a configurable item set by a provider of the navigation system, by user preference configuration, or both.

The present invention has particular applicability to any business or personal traveler who likes to accurately plan out a trip itinerary which includes the arrival time at each stop. The invention can also be advantageous to travel services such as the Automobile Association of America (AAA)™.

While the invention has been described with reference to the exemplary embodiments thereof, those skilled in the art will be able to make various modifications to the described embodiments of the invention without departing from the true spirit and scope of the invention.

What is claimed is:

1. A navigation system for providing driving directions, comprising:
   a navigation system module to calculate a best route between an origin and a destination; and
   a historical traffic database containing entries relating an expected speed based on historical traffic conditions for a plurality of road segments, at a given time;
   wherein said navigation system module, accesses said historical traffic database to calculate a deviation in speed between a time of travel based on a posted speed limit and a time of travel based on a predicted speed for a particular road segment associated with said historical traffic conditions, calculate a deviation in travel time for said particular road segment, and eliminate said particular road segment from said best route calculation when said deviation in travel time exceeds a threshold deviation percentage.

2. The navigation system for providing driving directions according to claim 1, further comprising:
   a historical data maintenance system to provide periodic updates to said historical traffic database that revise predicted speeds due to recent traffic on relevant road segments.

3. A method of providing driving directions to a driver, comprising:
   obtaining, at a navigation system, a destination of a trip to be taken;

obtaining, from a historical traffic database, an entry relating an expected speed based on historical traffic conditions for a plurality of road segments, at a given time;

obtaining, at said navigation system, a time of departure of said trip, said time of departure being in the future;

accessing a historical traffic database;

calculating, with said navigation system, a deviation in speed between a time of travel based on a posted speed limit and a time of travel based on a predicted speed for a particular road segment associated with said historical traffic conditions;

calculating a deviation in travel time for said particular road segment; and when said deviation in travel time exceeds a threshold deviation percentage, eliminating said particular road segment from a best route calculation.

4. The method or providing driving directions to a driver according to claim 3, further comprising:

calculating a deviation in duration of said trip between a duration calculated based on posted speed limits of road segments to be traveled, and a duration calculated based on historical data at expected times of use of relevant road segments.

5. The method of providing driving directions to a driver according to claim 4, further comprising:

essentially closing at least one road segment from consideration of use on said trip when a speed along said at least one road segment is slower than a given threshold percentage of a posted speed limit along said at least one road segment; and recalculating said best route without use of said at least one closed road segment.

6. The method of providing driving directions to a driver according to claim 3, further comprising:

obtaining an origin of said travel.

7. The method of providing driving directions to a driver according to claim 3, wherein:

said future time is at least a day in the future.

* * * * *